US008991703B2

(12) United States Patent
Murdoch et al.

(10) Patent No.: US 8,991,703 B2
(45) Date of Patent: Mar. 31, 2015

(54) LATERAL DISCRIMINATION METHOD AND DEVICE

(75) Inventors: Graham Alexander Munro Murdoch, Wollstonecraft (AU); Stuart Colin Littlechild, Haberfield (AU)

(73) Assignee: Sato Vicinity Pty Ltd, Clayton (AU)

( * ) Notice: Subject to any disclaimer, the term of this patent is extended or adjusted under 35 U.S.C. 154(b) by 0 days.

(21) Appl. No.: 13/634,319

(22) PCT Filed: Mar. 18, 2011

(86) PCT No.: PCT/AU2011/000300
§ 371 (c)(1),
(2), (4) Date: Sep. 24, 2012

(87) PCT Pub. No.: WO2011/113104
PCT Pub. Date: Sep. 22, 2011

(65) Prior Publication Data
US 2013/0193207 A1  Aug. 1, 2013

(30) Foreign Application Priority Data
Mar. 18, 2010 (AU) ................................. 2010901137

(51) Int. Cl.
*G06K 7/00* (2006.01)
*H04Q 5/22* (2006.01)
*G06K 7/10* (2006.01)
*G01V 15/00* (2006.01)
*G01S 13/75* (2006.01)

(52) U.S. Cl.
CPC ............ *G06K 7/10009* (2013.01); *G01V 15/00* (2013.01); *G01S 13/75* (2013.01)

USPC ..... 235/439; 340/10.1; 340/572.1; 340/572.7

(58) Field of Classification Search
USPC ................. 235/439; 463/17; 340/10.1, 572.1, 340/572.7
See application file for complete search history.

(56) References Cited

U.S. PATENT DOCUMENTS

| 7,612,675 | B2 | 11/2009 | Miller et al. |
| 8,187,075 | B2* | 5/2012 | Koyama ......................... 463/17 |
| 2004/0178267 | A1 | 9/2004 | Tsirline et al. |
| 2009/0075723 | A1* | 3/2009 | Richard et al. .................. 463/25 |
| 2009/0289773 | A1 | 11/2009 | Hoyt et al. |
| 2010/0156599 | A1* | 6/2010 | Ainsbury et al. ............ 340/10.1 |

OTHER PUBLICATIONS

Ramachandran, M., "International Search Report", for PCT/AU2011/000300, as mailed Jun. 3, 2011, 4 pages.

* cited by examiner

*Primary Examiner* — Daniel Hess
(74) *Attorney, Agent, or Firm* — Winstead PC

(57) ABSTRACT

The present invention relates to the field of radio frequency identification (RFID). In one form, the invention relates to a method and/or device adapted to provide at least some level of providing lateral discrimination within a given area. The invention has been developed primarily for interrogating multiple passive transponders which are attached to objects to be identified by those respective transponders and will be described hereinafter with reference to that application. A typical application is the identification of RFID transponders or other RFID devices, such as those embedded in plastic tokens or cards within a selected area and which may be provided near each other or stacked on each other.

22 Claims, 10 Drawing Sheets

Other antenna and multiplexers

Figure 11

|  | Coil 1 | Coil 2 | Coil 3 | Coil 4 | More Coils |
|---|---|---|---|---|---|
| Field level 1 |  |  |  | Transponder 4 |  |
| Field level 2 |  | Transponder 2 |  | Transponder 4 |  |
| Field level 3 |  | Transponder 2 | Transponder 4 | Transponder 4 |  |
| Field level 4 | Transponder 2 | Transponder 2 | Transponder 2 Transponder 4 | Transponder 4 |  |
| Field level 5 | Transponder 2 | Transponder 2 | Transponder 2 Transponder 4 | Transponder 4 |  |
| More Field Levels | Transponder 2 | Transponder 2 | Transponder 2 Transponder 4 | Transponder 4 |  |

Figure 12

|  | Coil 1 | Coil 2 | Coil 3 | Coil 4 | More Coils |
|---|---|---|---|---|---|
| Transponder 2 | Received Excitation Level 3 | Received Excitation Level 5 | Received Excitation Level 3 |  |  |
| Transponder 4 |  |  | Received Excitation Level 4 | Received Excitation Level 6 |  |
| More Transponders |  |  |  |  |  |

LATERAL DISCRIMINATION METHOD AND DEVICE

FIELD OF INVENTION

The present invention relates to the field of radio frequency identification (RFID).

In one form, the invention relates to a method and/or device adapted to provide at least some level of providing lateral discrimination within a given area.

The invention has been developed primarily for interrogating multiple passive transponders which are attached to objects to be identified by those respective transponders and will be described hereinafter with reference to that application. A typical application is the identification of RFID transponders or other RFID devices, such as those embedded in plastic tokens or cards within a selected area and which may be provided near each other or stacked on each other.

It will be convenient to hereinafter describe the invention in relation to identification of RFID transponders, however it should be appreciated that the present invention is not limited to that use only.

BACKGROUND ART

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

In the application of RFID technology to Casinos, casino managers are interested in the capability of recording all of the bets being placed within their premises in real time. This requires a precise and reliable means for identifying the various gaming chips disposed inside, or in close proximity to, the betting zones, as delineated by the markings disposed on the surface of the gaming tables. Various systems have been developed which have the ability to automatically flag in real-time, or in near rear time, any unusual and suspicious events. These systems can also continuously tracking the performance of individual players and are used to assess the short, medium and long-term performance of casino personnel.

When the objects are gaming chips, tokens, or plaques, and the surface is a casino gaming table such as Baccarat, Mini-baccarat, Blackjack or Pai Gow Poker, the demarked areas of interest are called "betting spots" or areas associated with each player's bet. The table top is delineated with graphics and other indicia on a covering material called a "layout". In play and placing bets, the chips may be stacked in columns up to 25 high, for example. For Blackjack, allowance must also be made for the placement of "double down" or "split" bets which are placed just outside the "betting spot". For Baccarat the player betting areas are adjacent and also include adjacent "banker/player/tie" locations.

When automatically communicating with objects which have an embedded RFID chip, responses must be correctly associated with a player location/bet area for this information to be useful to a gaming table system tracking bets and payouts. An RFID inlay, i.e., the "tag," is disposed within the gaming chip. The inlay is an electronics assembly substrate that connects a planar coupler coil or loop and the semiconductor RFID die. Accordingly, it is necessary to know, the precise location or presence of "tagged objects" within a demarked area. The size of the area may cover several centimeters of extent and adjacent areas may have contiguous narrow boundaries of the order of 6 mm. All sensing equipment is preferably below the table top and out of sight of the players. That is, it is not desired to place couplers, antennas, etc., above the table top.

In one approach, radio frequency identification (RFID) technology based on radiated fields (far fields) operating at approved frequencies such as 433 MHz, 915 MHz, 2.4 GHz etc has been used. While promising, this technology has a major drawback. It is not particularly precise in terms of spatial resolution. As a result, its potential is limited to its application to gaming surfaces with single betting areas, such as poker tables, or to tables with betting areas separated by relatively large spaces. Because of both its operating principle and the frequencies at which it operates, this technology is subject to effects that disturb the local field. For example antennas may be detuned by parasitic capacitance (people and metal objects). Signals may be attenuated by the human body. Further, signal propagation may be affected by multipath phenomena. Accordingly, existing RFID based technology is considered inadequate when applied to gaming surfaces having multiple betting areas in close proximity to each other, such as the ones used in blackjack or baccarat. The problem is exacerbated when the gaming chips are disposed on the separation lines between betting areas, such as roulette tables.

Other prior art attempts at addressing these problems have used inductively coupled RFID in the HF frequency band. The terms "Induction field" or "induction coupler" refer to the domain of interacting short range magnetic fields (H fields) that operate by "transformer action" rather than electromagnetic radiation. Magnetic coupling RFID based technology typically operates at approved frequencies in the 125 KHz or 13.56 MHz bands. Because of the inherent "near field" characteristics of this technology, the signal dies off very rapidly beyond the intended coverage, area and surrounding environment variations have much less of an impact. Those of ordinary skill in the art will understand that the term "read," or "reading chips," refers to an RFID Reader electronics unit transmitting one or more interrogation messages to the RFID transponder disposed within the gaming chip. The interrogation message supplies a wireless "induction field" that provides power to the passive RFID inlay. The class of RFID used is "passive" where transponders are powered solely by capturing energy from the Reader-generated impinging field. The RFID inlay receives the interrogation message(s) and provides a response to the reader. These RFID devices generally also follow the rule of Reader Talks First (RTF).

However, there are drawbacks associated with this approach as well. While the transformer based induction coupler technology represents an improvement over the radiated far-field RFID technology, it is not accurate enough to discriminate between closely spaced betting zones. As noted above, chips may be stacked on top of each other. Any approved system must provide communication with a chip on the top of a stack that may be 25 chips high (for example). The lateral fall-off characteristics of the coupler-generated H field (magnetic field) which can be computed by using the Biot-Savart law. Those of ordinary skill in the art will understand that the magnetic field produced by an embedded loop is roughly spherically shaped. Accordingly, the magnetic field extends approximately the same distance laterally as it does vertically. In particular, the field strength required to reach the top of the chip stack will also result in the field impinging on the neighbouring betting spot. This phenomenon is commonly referred to as "cross read" or "cross talk."

U.S. Pat. No. 7,612,675 describes one attempt to address these various problems. In essence, U.S. Pat. No. 7,612,675 provides a 'jamming' antenna, which in effect 'jams' the cross talk signal. Unfortunately, the reader associated with the 'jamming' antenna is complex. The system disclosed requires a reader, a jammer and a flux canceller.

SUMMARY OF INVENTION

An object of the present invention is to provide an improved apparatus and/or method of communicating in an RFID system.

It is an object of the embodiments described herein to overcome or alleviate at least one of the above noted drawbacks of related art systems or to at least provide a useful alternative to related art systems.

In a first aspect of embodiments described herein there is provided a device and/or method of providing a signal between a tag and an interrogator, in an RFID system, comprising energising a coil to provide a magnetic field having an internal flux of a first strength and an external flux of a second strength, the internal flux having a greater strength than the external flux, and correlating the strength of the magnetic field with a tag(s) location.

In another aspect of embodiments described herein there is provided an RFID system and/or method adapted to enable communication of a signal between a tag(s) and an interrogator, comprising a driver adapted to energise a coil to provide a magnetic field having an internal flux of a first strength and an external flux of a second strength, the internal flux having a greater strength than the external flux, and logic means adapted to correlate the strength of the magnetic field with a tag(s) location.

Other aspects and preferred forms are disclosed in the specification and/or defined in the appended claims, forming a part of the description of the invention.

In essence, embodiments of the present invention stem from the realization that the relative asymmetry in the magnitude of the magnetic field on the inside of a coil when compared to the magnitude of field outside of a coil can be exploited to predict and/or determine the location of a transponder proximate the inside or outside of the coil. The inventors have realised that, field strength inside a coil results from an addition of the fields produced by various parts of the coil, whereas the field strength outside the coil results from a subtraction of the fields from different parts of the coil. This creates an asymmetry in the magnitude of the field between the inside and the outside of a coil. This asymmetry is strongest close to the coil perimeter and is even stronger for relatively small sized coil(s). To exploit this, the inventors have determined that if two coils are placed closely adjacent, then by progressively increasing the field strength in each coil the transponder(s) on the inside of each coil can be communicated with and/or powered before transponder(s) outside the coil(s). Furthermore there is no loss of system performance when the invention is applied to an ISO18000-3 Mode 2 RFID system.

Advantages provided by the present invention comprise the following:
  Allows the location of transponders to be uniquely determined even when coils are placed very closely together
  Very simple implementation with only the coil current being varied
  No change in reader coil design is required.
  No loss of system performance when the invention is applied to an ISO18000-3 Mode 2 RFID system Throughout this document, the terms 'signal' or 'signals' includes within their scope any form of electromagnetic radiation. The signal may, for example, be a powering signal, or a data signal or an informational signal.

Throughout this document, the term 'coil' or 'antenna' should be construed in a non-limiting way. The term 'coil' or 'antenna' may include, for example, any signal receiving apparatus or magnetic field receptor as the present invention has many applications. As can be appreciated, the shape of the coil or antenna herein described should not be limited to a particular configuration. The shape is dependent on its application or use.

Throughout this document, the term 'transponder' or 'tag' or 'chip' should be construed in a non-limiting way. The term 'transponder' or 'tag' or 'chip' may include, for example, any RFID device attached to an item for the purposes of identification.

Throughout this document the term 'field' refers to the magnetic field intensity H measured in A/m or the magnetic flux density B measured in Tesla. The magnetic flux $\phi$ is the amount of magnetism passing through an area and is measured in Weber. Field measures the strength of the magnetic field at a point where as flux integrates the magnetic field over a surface. Flux is useful when considering the total amount of magnetic field passing through a transponder as the voltage induced in the transponder coil is proportional to the flux passing through the transponder coil.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

FIG. 11 illustrates example operation of the present invention.

FIG. 12 illustrates another example operation of the present invention.

DETAILED DESCRIPTION

The asymmetry between the magnetic field on the inside of a coil compared to the outside of a coil can be exploited to determine the location of a transponder to be inside or outside the coil. On the inside perimeter of a coil the fields from the conductor next to the measurement point and the conductor on the opposite side of the coil add where as these fields subtract outside the perimeter of the coil. This creates an asymmetry in the magnitude of the field between the inside and the outside of a coil. This asymmetry is strongest close to the coil perimeter and strongest for small size coil dimensions. If two coils are placed proximate or closely adjacent then, by progressively changing, increasing and for decreasing the field strength in each coil, the transponders on the inside of each coil can be uniquely distinguished. Furthermore there is no loss of system performance when the invention is applied to an ISO18000-3 Mode 2 RFID system.

Figure 1:
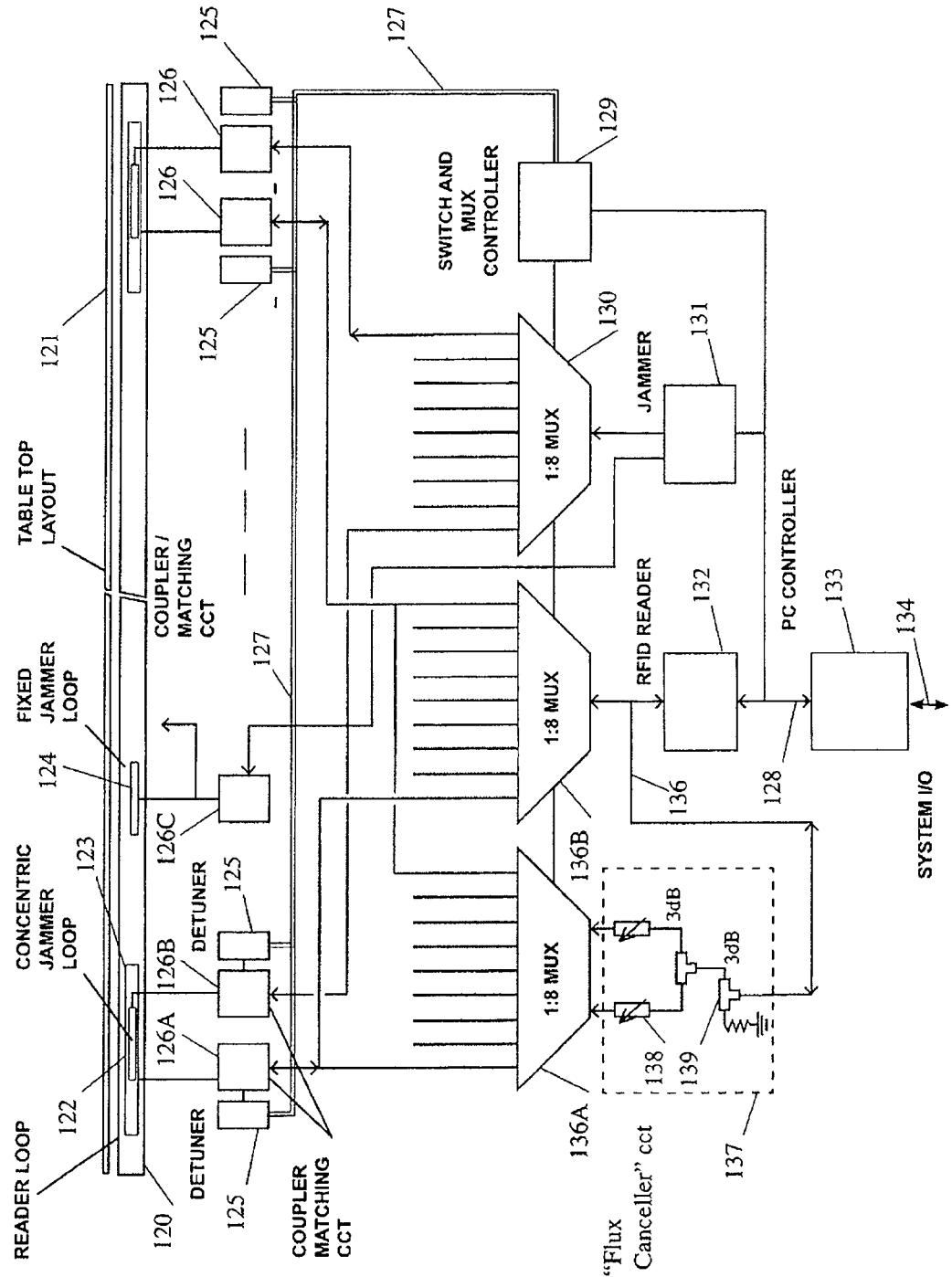
FIG. 1 illustrates an example of prior art methods of preventing cross reading.
Figure 2:
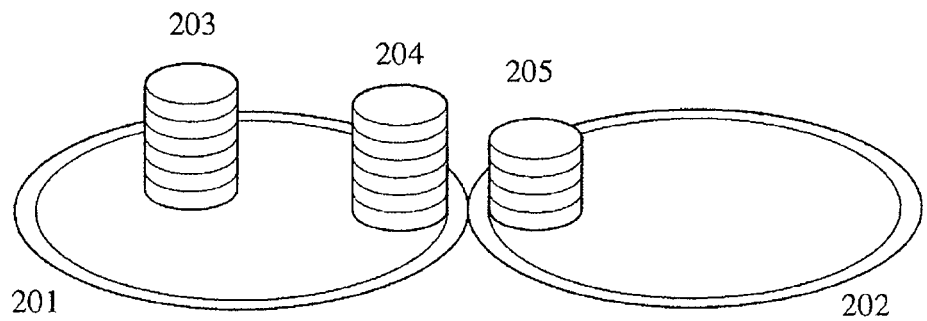
FIG. 2 illustrates an example application for the invention.

FIG. 2 illustrates an example application of the invention where two reader coils 201 and 202 are located relatively close together. Inside these coils transponder(s) 203, 204 and 205 may be placed. Some of these transponder(s), for example 204 and 205, may be located relatively close together and thus, without the aid of the present invention, the interrogation field from coil 201 may read transponder 205 in the adjacent coil 202. Likewise the interrogation field from coil 202 may read transponder 204 in the adjacent coil 201, without the aid of the present invention. This is undesirable and it is intended that the transponders inside each coil are identified and associated with their correct coil.

Figure 3:
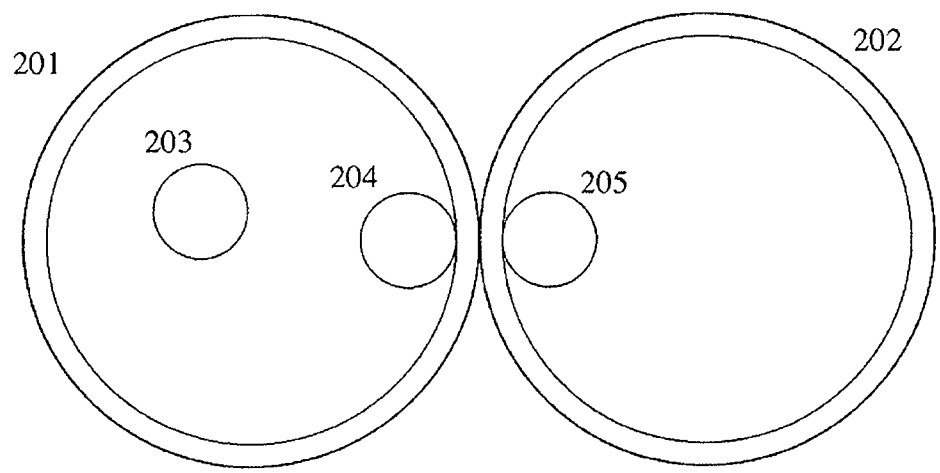
FIG. 3 shows the example application in plan view.

FIG. 3 shows the example application of FIG. 2 in plan view. The reader coils 201 and 202 and transponders 204 and 205 are shown in close proximity.

Figure 4A:
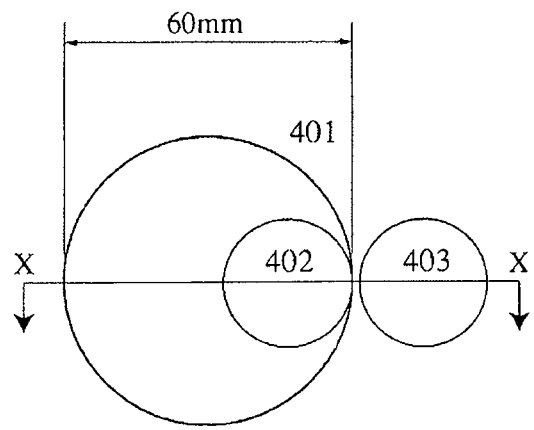
FIGS. 4a to 4d show the magnetic field and flux asymmetry for a small coil.
Figure 4B:
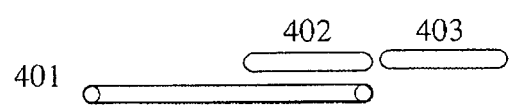
Figure 4C:
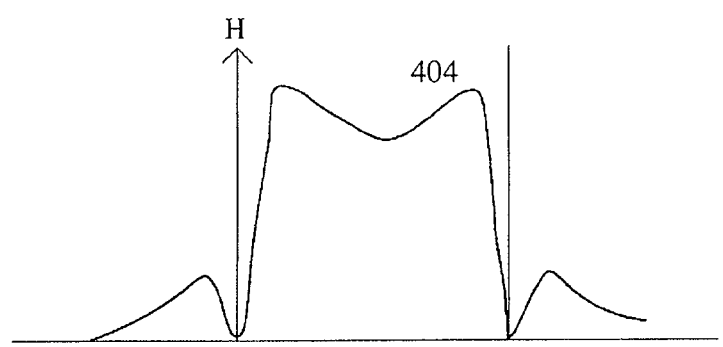
Figure 4D:
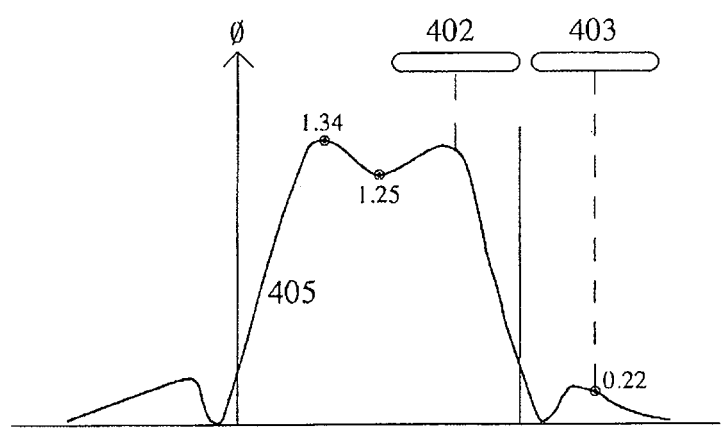

FIGS. 4a to 4d show the magnetic field and flux asymmetry for a small circular coil of 60 mm diameter, by way of example only. FIG. 4a shows the coil 401 and two transponders 402 and 403, one inside the coil and one outside the coil. FIG. 4b shows the coil and transponders in cross section. The magnitude of the magnetic field strength H measured along the line X-X is shown 404 in FIG. 4c. There is a phase reversal between the field inside the coil and the field outside the coil however for clarity purposes this is not shown. The flux $\phi$ collected by an example transponder antenna 25 mm in diameter is plotted 405 in FIG. 4d. The finite size of the transponder antenna performs a low pass filtering function on the magnetic field strength and smooths the curve of FIG. 4c. The flux 405, measured in arbitrary units, for a transponder at the centre of the coil is 1.25, just inside the coil is 1.34 and just outside the coil is 0.22. The minimum flux inside the coil is 5.7 times larger than the maximum flux outside the coil.

Figure 5A:
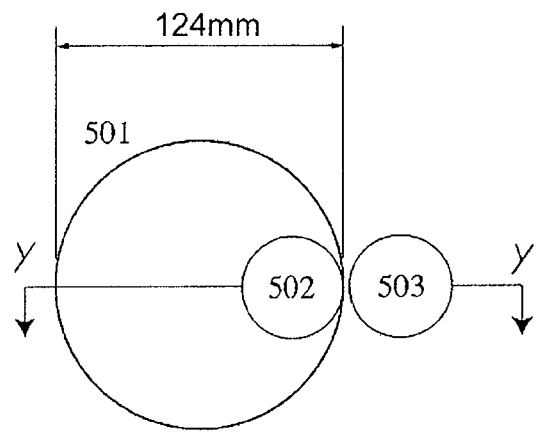
FIGS. 5a to 5d show the magnetic field and flux asymmetry for a larger coil.
Figure 5B:
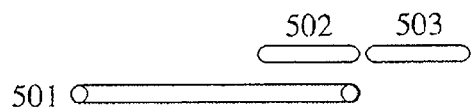
Figure 5C:
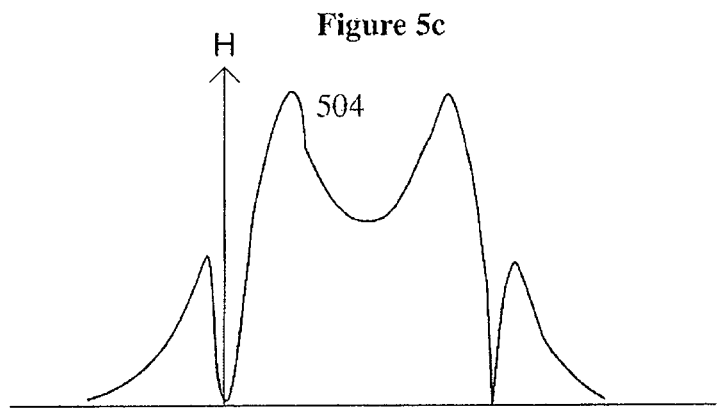
Figure 5D:
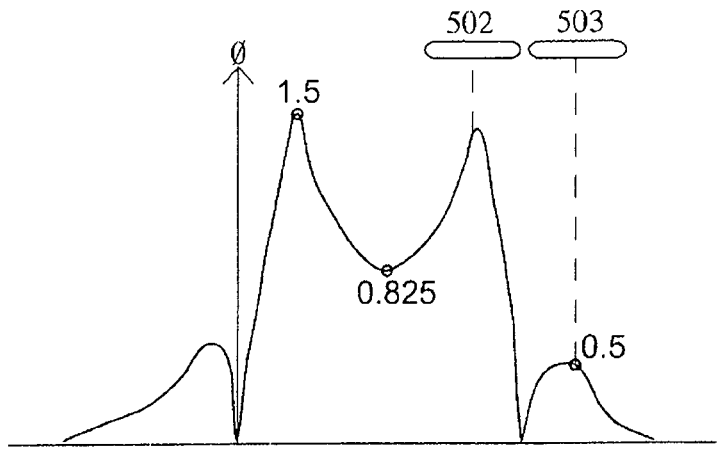

FIGS. 5a to 5d show the magnetic field and flux asymmetry for a circular coil of 124 mm diameter, by way of example only. FIG. 5a shows the coil 501 and two transponders 502 and 503, one inside the coil and one outside the coil. FIG. 5b shows the coil and transponders in cross section. The magnitude of the magnetic field strength H measured along the line Y-Y is shown 504 in FIG. 5c. There is a phase reversal between the field inside the coil and the field outside the coil however for clarity purposes this is not shown. The flux $\phi$ collected by an example transponder antenna 25 mm in diameter is plotted 506 in FIG. 5d. The finite size of the transponder antenna performs a low pass filtering function on the magnetic field strength and smooths the curve of FIG. 5c. The flux 506, measured in arbitrary units, for a transponder at the centre of the coil is 0.825, just inside the coil is 1.50 and just outside the coil is 0.50. The minimum flux inside the coil is 1.6 times larger than the maximum flux outside the coil.

Figure 6A:
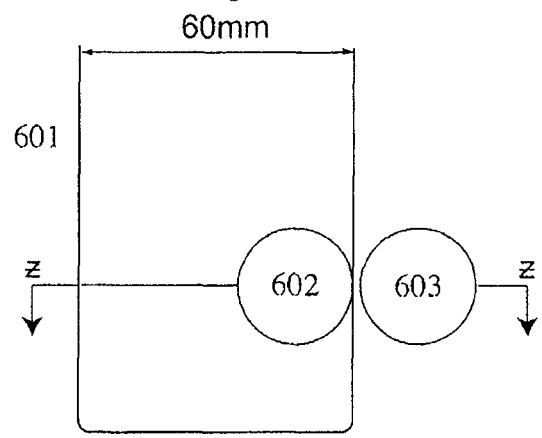
FIGS. 6a to 6d show the magnetic field and flux asymmetry for a narrow rectangular coil.
Figure 6B:
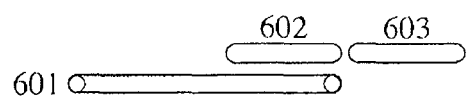
Figure 6C:
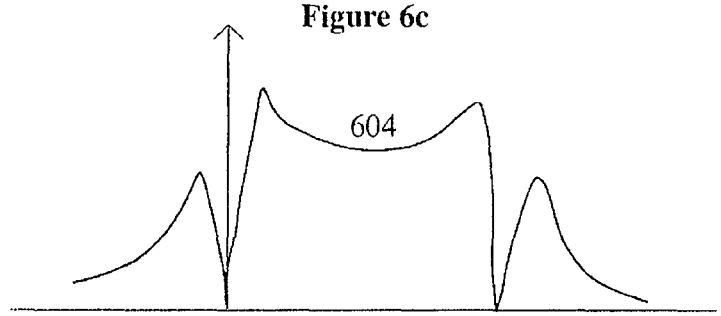
Figure 6D:
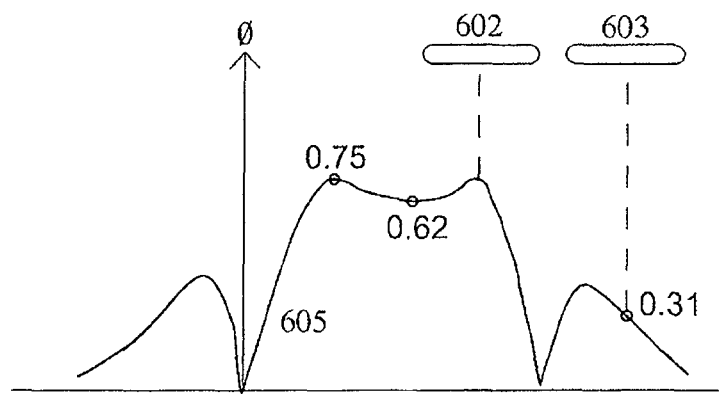

FIGS. 6a to 6d show the magnetic field and flux asymmetry for a relatively narrow rectangular coil 60 mm wide, by way of example only. FIG. 56a shows the coil 601 and two transponders 602 and 603, one inside the coil and one outside the coil. FIG. 6b shows the coil and transponders in cross section. The magnitude of the magnetic field strength H measured along the line Z-Z is shown 604 in FIG. 6c. There is a phase reversal between the field inside the coil and the field outside the coil however for clarity purposes this is not shown. The flux $\phi$ collected by an example transponder antenna 25 mm in diameter is plotted 605 in FIG. 6d. The finite size of the transponder antenna performs a low pass filtering function on the magnetic field strength and smooths the curve of FIG. 6c. The flux 605, measured in arbitrary units, for a transponder at the centre of the coil is 0.62, just inside the coil is 0.75 and just outside the coil is 0.30. The minimum flux inside the coil is 2 times larger than the maximum flux outside the coil.

Figure 7A:
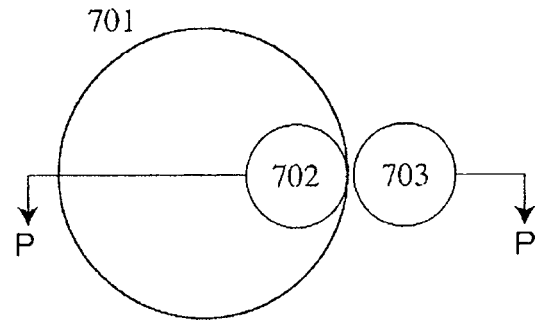
FIGS. 7a to 7d show the application of magnetic field and flux asymmetry to the invention for a coil.
Figure 7B:
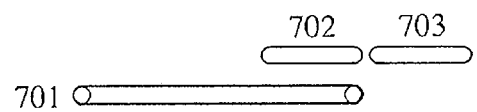
Figure 7C:
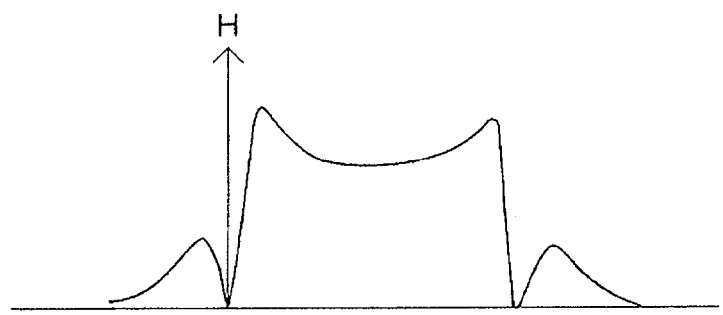

FIGS. 7a to 7d show the application of magnetic field and flux asymmetry to the invention for a circular coil, by way of example only. FIG. 7a shows the coil 701 and two transponders 702 and 703, one inside the coil and one outside the coil. FIG. 7b shows the coil and transponders in cross section. The magnitude of the magnetic field strength H measured along the line P-P is shown in FIG. 7c. There is a phase reversal between the field inside the coil and the field outside the coil however for clarity purposes this is not shown. The flux $\phi$ collected by an example transponder antenna 25 mm in diameter is plotted in FIG. 7d. The finite size of the transponder antenna performs a low pass filtering function on the magnetic field strength and smooths the curve of FIG. 7c.

Figure 7D:
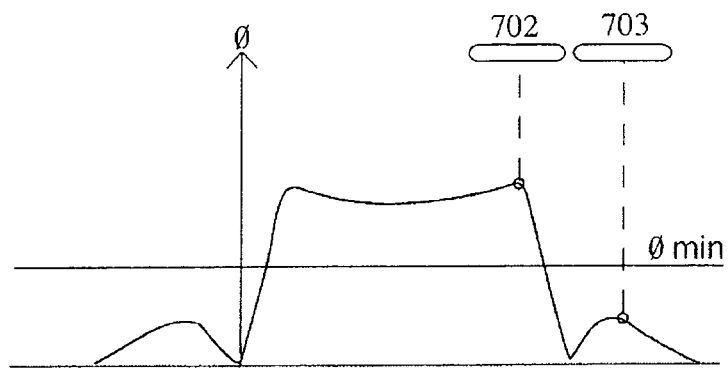
Figure 8A:
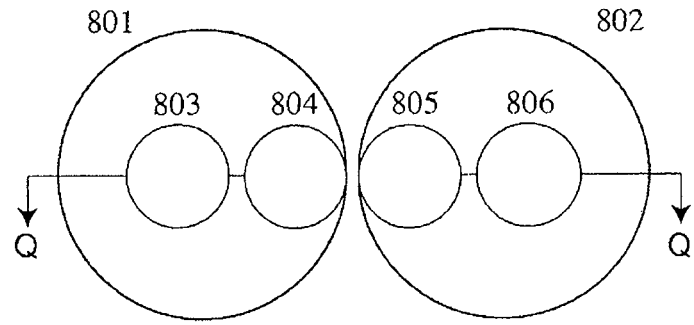
FIGS. 8a to 8d show the application of magnetic field and flux asymmetry to the invention for two coils.
Figure 8B:
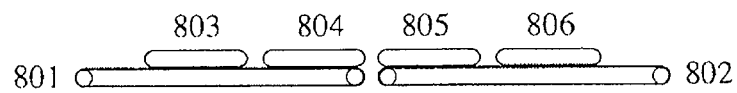
Figure 8C:
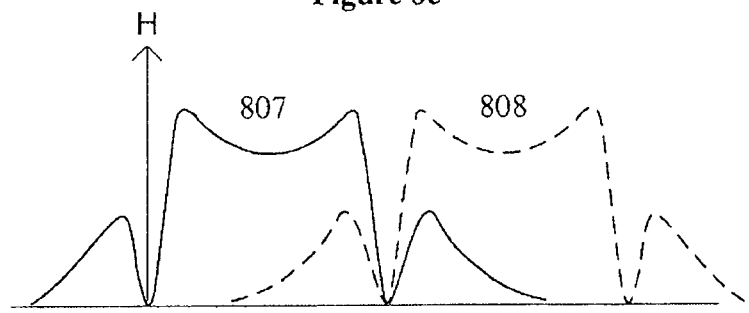
Figure 8D:
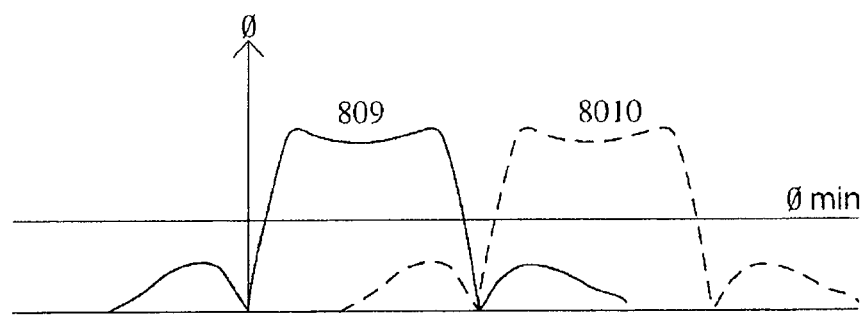

As illustrated in the above examples, coil(s) exhibit a flux profile in which the minimum flux inside the coil is larger than the maximum flux outside the coil, and this may be, for example, by a factor of between 1.6 for a relatively large coil) and 5.7 for a relatively small coil. To operate a transponder requires a minimum flux $\phi_{min}$. If the field strength of the coil is adjusted such that the minimum internal flux is greater than $\phi_{min}$ and the maximum external flux is less than $\phi_{min}$ then only transponders inside the coil will operate. FIG. 7d shows an example position of $\phi_{min}$ that meets these criteria. Provided the minimum flux inside the coil is larger than the maximum flux outside the coil there will be a flux level at which only transponders inside the coil will operate. FIGS. 8a to 8d show the application of magnetic field and flux asymmetry of the invention in the example application of two circular coils. FIG. 8a shows the two coil 801 and 802 and transponders 803, 804, 805 and 806. FIG. 8b shows the coils and transponders in cross section. The magnitude of the magnetic field strength H measured along the line Q-Q is shown 807 and 808 in FIG. 8c. There is a phase reversal between the field inside each coil and the field outside each coil however for clarity purposes this is not shown. The flux $\phi$ collected by a transponder antenna is plotted 809 and 8010 in FIG. 8d. The finite size of the transponder antenna performs a low pass filtering function on the magnetic field strength and smooths the curve of FIG. 8c. As illustrated in this example, the minimum flux inside the coil is larger than the maximum flux outside the coil by a factor of between 1.6 for relatively large coil(s) and 5.7 for relative small coil(s). To operate a transponder requires a minimum flux $\phi_{min}$. If the field strength of both coils is adjusted such that the minimum internal flux is greater than $\phi_{min}$ and the maximum external flux is less than $\phi_{min}$ then only transponders inside each coil will operate. FIG. 8d shows an example position of $\phi_{min}$ that meets this criterion.

Where transponders are stacked, that is a plurality of tags are arranged so they overlap each other at least partially, the flux level $\phi_{min}$ has been found to operate transponders at the bottom of the stack and closest to the coil perimeter but may not be adequate enough to operate transponders higher up the stacks. The transponders higher up the stack are further away from the coil and therefore the field and flux levels are diminished. In order to read transponders higher up the stack the field and flux levels need to be increased. As the field and flux levels are highest adjacent to the coil turns (on both the inside and outside), increasing the field and flux levels in order to read stacked transponders may increase the field and flux levels on the outside of each coil to a level at which adjacent transponders outside the coil are read. In prior art systems this would constitute cross reading. However the transponders at the bottom of each stack and closest to the coil perimeters having already been identified and correctly associated with their respective coil can be ignored if they are subsequently identified by an adjacent coil. By increasing the field and flux levels of all of the coils in small steps transponders higher up in stacks, can be read whilst transponders cross read in adjacent coils can be ignored as they will already have been identified and correctly associated with their respective coils.

In other words; because the external field is always less than the internal field for any particular field and flux levels, transponders inside the coil will be identified at a lower excitation level than transponders outside the coil. A transponder will always be identified first by its correct coil at the lower excitation level. Having been identified and associated with a coil any further identifications of the transponder by an adjacent coil at higher excitation levels may be ignored.

An explanatory example sequence of operation for an RFID system where coils are multiplexed such that only one coil or relatively spaced apart coils are active at any time is as follows:

When simple coils are closely located it is possible for a transponder on one coil to be read by many coils and thus the transponder location is unknown (cross-reading). One method to overcome this problem is as per the following steps:

1. A weak field is provided by the first coil which conducts an identification sequence. This weak fielded will only identify transponder(s) on the bottom of the stacks located on the powered coil. The weak field will likely not power any transponder on adjacent coils and thus will not identify them. Next a weak field and an identification sequence is provided by the remaining coils, one at a time. The result of the above is that transponders at the bottom of stacks are only identified by the correct coils.

2. Then an increase field is provided by the first coil which again conducts an identification sequence. The increased field identifies transponders on the powered coil from the bottom of stacks to higher up stacks than in step 1. This increased field may also identify transponders at the bottom of stacks on adjacent coils however this is not a problem as these transponders preferably have already been correctly located with a weaker field cycle. Next, an increased field and an identification sequence is provided by the remaining coils one at a time.

3. Then step 2 is repeated until the maximum field is reached and the transponders at the top of all stacks have been powered and identified. Each time the field is increased; more and more transponders on adjacent coils can be identified however these transponders on adjacent coils have already been correctly located during earlier weaker field cycles.

The method is not limited to multiplexed coils and is just as applicable to systems where all coils are always active or any combination of permanently active and multiplexed coils.

In an alternate sequence of operation to the method described above can be thought of as using the same field strength (starting with the weakest) to identify transponders on all coils. Then increasing the field strength and using the increased field strength to identify more transponders on each of the coils. The coil on which a transponder is first identified will always correctly identify the coil on which the transponder is located. Due to the asymmetry between the flux inside and outside of a coil the transponder will always be identified on its correct coil at as weaker field strength than on any adjacent coil.

Rather than using a progressively increased field strength on sequenced coils to identify and locate transponders an alternative method is to progressively increase the field strength on a coil and identify all transponders on, at or near that coil, whilst noting the field strength at which each transponder is first identified, before moving on to the next coil. The transponder will likely be identified at the lowest field strength on the coil it is located on compared to any other adjacent coil.

An explanatory example sequence of this alternative method of operation for an RFID system where coils are multiplexed such that only one coil is active at any time is as follows:

1. A first coil, using a weak field, conducts an identification sequence. This weak field will only identify transponders on the bottom of the stacks located on the powered coil. The weak field will not power any transponders on adjacent coils and thus will not identify them. The reader records which transponders are identified at this weak field strength.

2. Next the field strength is increased on the same first coil which conducts another identification sequence. The increased field identifies transponders on the powered coil from the bottom of stacks to higher up stacks than in step 1. This increased field may also identify transponders towards the bottom of stacks on adjacent coils however the correct location of these transponders will be resolved in step 5. The reader records which transponders are first identified at this increased field strength.

3. Then step 2 is repeated until the maximum field is reached and the transponders at the top of all stacks on the first coil have been powered and identified. Each time the field is increased, more and more transponders on adjacent coils may be identified however the correct location of these transponders will be resolved in step 5. The reader records the field strength at which transponders are first identified.

4. Next steps 1 to 3 are conducted on all other associated coils.

5. Using the above method transponders will be identified on either one coil only or on multiple coils. If a transponder is identified by one coil only then that transponder is located on or close to that coil. If a transponder is identified by multiple coils then it is located on or closest to the coil that identifies the transponder using the lowest field strength.

The method can be further enhanced by identifying and muting transponders at each Field Level and monitoring the number of transponders newly attempting to reply. If the Field Level is increased and no further replies are seen then all of the transponders on the coil have been identified and the locating sequence on the coil can be stopped and commenced on the next coil.

The alternate method of identifying all transponders on, at or near a coil before moving on to the next coil has some significant advantages compared to the method of sequencing all coils at the same field strength and then incrementing the field strength. These advantages are as follows:

The emission spectrum is minimized as the antennas are not being switched on and off many times. Rapid and repetitive switching of the powering field generates harmonics which may infringe emission regulations.

The identification time is optimized as transponders on a coil once identified will not require re-identification as they remain powered for the whole of the identification sequence.

The identification time is optimized as the latency time required switching coils on and off is greatly reduced. Rather than multiple coil switching there is only a single coil switching event per coil.

FIG. 11 shows in tabular form the two example sequence described above with transponder 2 located on Coil 2 and transponder 4 located on Coil 4. FIG. 11 shows how the two methods are functionally equivalent. Whilst they are functionally equivalent the second method is advantageous in ways that are explained above. Referring to FIG. 11 the first and alternate methods can be described as follows:

The first method is equivalent to selecting a Field Level and then sequencing through the Coils horizontally across the table. For example selecting Field Level 1 and then sequencing through Coil 1, then Coil 2, then Coil 3 and so on. Then increasing the Field Level to 2 and sequencing through the Coils again and so on.

The alternate method is equivalent to selecting a Coil and then sequencing through the Field Levels moving vertically down the table. For example selecting Coil 1 and then sequencing through Field Level 1, then Field Level 2, then Field Level 3 and so on. Then selecting Coil 2 and sequencing through the Field levels.

Irrespective of the method used, transponders 2 and 4 will be identified on their respective Coils at the lowest Field Levels compared to any other Coils. Given knowledge of the Field Levels it is a simple matter to correctly deduce the transponder location.

The Field Level (and Coil) at which a transponder first powers up can be stored on the transponder to provide an improved second alternative method of locating transponders. If the reader transmits the Field Level as part of each identification command and the transponder stores the Field Level from the first identification command it receives as state information in a temporary memory, such as TRAM, then the transponder will have stored the Field Level at which is first powered up. Subsequent commands with higher Field Level values are not stored by the transponder. If the transponder then includes this first Field Level in its reply messages then the reader will know the Field Level at which the transponder first powered up without having to identify the transponder when it first powered up. The identification process is therefore decoupled from the determination of the transponder location.

An explanatory example sequence of this second alternative method of operation for an RFID system where coils are multiplexed such that only one coil is active at any time is as follows:

1. A first coil, starting with its weakest field, transmits an identification command with the Field Level included. This weak field will only power transponders on the bottom of the stacks located on the powered coil. The weak field will not power any transponders on adjacent coils. The Field Level is stored by any transponders that are powered. This stores in the transponder the minimum Field Level at which the transponder powers up.
2. Next the field strength is increased on the same first coil which transmits another identification command with a new and larger Field Level included. The increased field powers transponders from the bottom of stacks to higher up stacks than in step 1. Only the newly powered transponders higher up the stacks will store the larger Field Level value. The increased field may also power transponders towards the bottom of stacks on adjacent coils which will also store the larger Field level value however the correct location of these transponders will be resolved in step 5.
3. Then step 2 is repeated until the maximum field is reached. With the coil at maximum power an identification sequence is carried out and all transponders powered by the coil are identified. Included in each transponders reply is the Field Level at which the transponder first powered up. Transponders on adjacent coils may also be identified however the correct location of these transponders will be resolved in step 5. The reader records the Field Level at which each transponder was first powered by the coil.
4. Next steps 1 to 3 are conducted on all other associated coils.
5. Using the above method transponders will be identified on either one coil only or on multiple coils. If a transponder is identified by one coil only then that transponder is located on or close to that coil. If a transponder is identified by multiple coils then it is located on or closest to the coil that identifies the transponder with the lowest Field Level.

A second alternate method of identifying all transponders on, at or near a coil before moving on to the next coil has the advantage of carrying out the identification sequence with the maximum number of tags. This makes best use of the multiple transponders handling protocol minimizing the identification time.

In another alternate method, the transponder may measure the excitation level it is receiving, for example by way of a power detection circuit or similar, and transmit the received excitation level value to a reader to provide an improved third alternate method of locating and/or identifying transponders. The reader may operate with one Field Level or a limited set of Field Levels and by comparing the transponder's received excitation level is able to locate each transponder's position. Due to the field and flux asymmetry the transponder will measure the highest excitation level for the coil it is located on or closet to compared to any other coil.

An explanatory example sequence of this third alternative method of operation for an RFID system where coils are multiplexed such that only one coil is active at any time is as follows:

1. A first coil conducts an identification sequence. This identification sequence will identify all transponders on and near the coil and may identify transponders on adjacent coils. Each transponder measures its own excitation level received by the transponder and includes this value in its replies. The reader records the received excitation level associated with each transponder identified.
2. Next step 1 is repeated for all remaining coils.
3. Using the above method transponders will be identified on either one coil only or on multiple coils. If a transponder is identified by one coil only then that transponder is located on or close to that coil. If a transponder is identified by multiple coils then it is located on or closest to the coil that identifies the transponder receiving the highest received excitation level.

The third alternate method has the significant advantage that no extra commands are required optimising the identification time.

FIG. 12 shows in tabular form the third alternate example sequence described above with transponder 2 located on Coil 2 and transponder 4 located on Coil 4.

Any combination of the methods described can be used to determine the location of transponders. The principle of using the asymmetry in the coil magnetic flux is however not limited to using the methods described above.

Figure 9A:
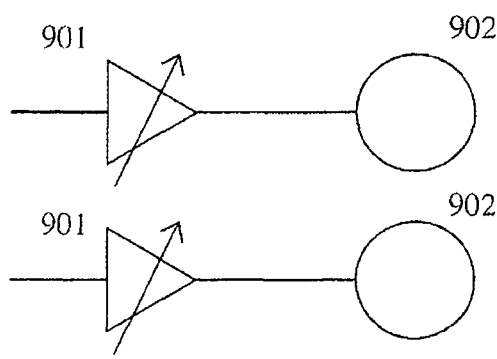
FIGS. 9a and 9b show example readers for the invention.
Figure 9B:
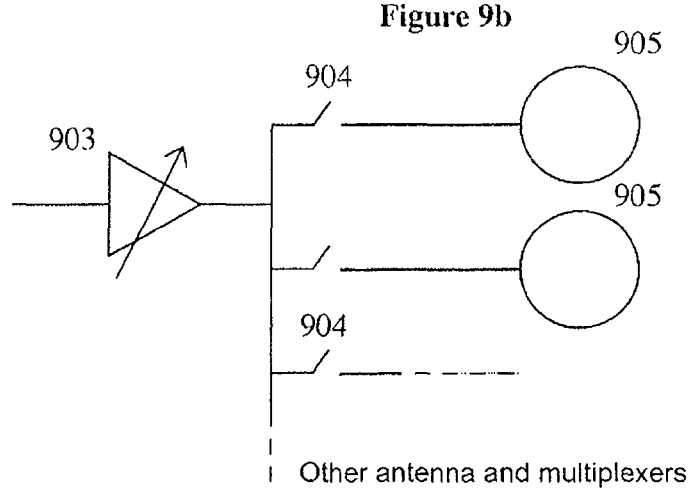

FIGS. 9a and 9b show example circuits for readers using the invention. Power amplifiers 901 and 903 with variable and controllable output levels are connected to coils 902 and 905. FIG. 9a shows an arrangement were each coil 902 has a dedicated power amplifier 901 and the coils may remain active at all times. FIG. 9b shows an arrangement where a single power amplifier 903 is multiplexed through multiplexing switches 904 to an array of coils 905 of which only two are shown. Only one coil is active at any time. The example reader shown in FIG. 9b is advantageous because of the reduce power amplifier cost.

Figure 10A:
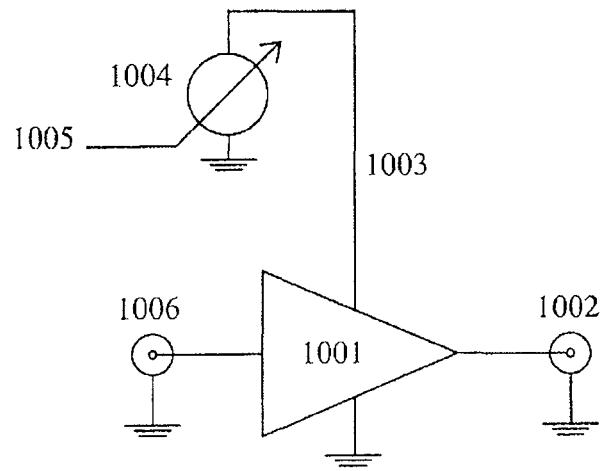
FIGS. 10a and 10b show example circuits that may be used for readers according to the invention.
Figure 10B:
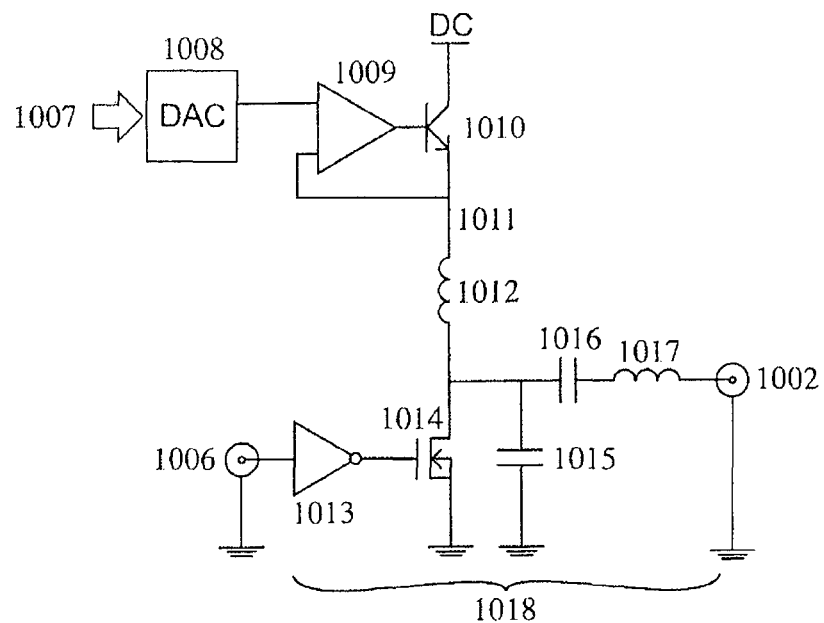

FIG. 10a shows an example schematic of a power amplifier 1001 with variable and controllable output level. The amplifier amplifies the input RFID signal 1006. The output power 1002 of the amplifier is a function of the amplifier's supply voltage 1003. The supply voltage is fed from a controllable voltage source 1004 which is controlled by a control line 1005. FIG. 10b shows an example circuit schematic for power amplifier with a variable and controllable output level. A digital control line 1007 controls the output voltage of a DAC 1008. The output voltage is buffered by op-amp 1009 and transistor 1010 and delivered as a low impedance DC supply voltage to class E amplifier 1018. The class E amplifier 1018 consists of a DC choke 1012, switching transistor 1014, input buffer 1013 and output filter circuit 1015, 1016 and 1017. The output power 1002 is a function of the DC supply voltage 1011. By controlling the DC voltage 1011 the output power and amplitude can be controlled to provide the increasing power levels required by the invention.

There is substantially no loss of system performance when the invention is applied to an ISO18000-3 Mode 2 RFID system. This comes about because the transponder anti-collision algorithm used by ISO18000-3 Mode 2 is not dependant on the transponders being identified in any particular sequence.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analogue technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A method of determining the location of a tag relative to two or more coils associated with an interrogator, in an RFID system, the method comprising the steps of:
    a. energizing each coil to provide a powering field having a first value;
    b. incrementing the value of the powering field; and
    c. correlating the power values at which the tag first becomes active in order to determine the tag location.

2. The method as claimed in claim 1, wherein the interrogator transmits a signal indicative of the power value.

3. The method as claimed in claim 1, wherein the tag provides a signal indicative of the power value at which the tag first becomes active.

4. The method as claimed in claim 3, wherein the tag(s) provides a signal indicative of the power value transmitted by the interrogator at which the tag first becomes active.

5. The method as claimed in claim 4, wherein the tag(s) stores the value indicative of the power field value when the tag first becomes active.

6. The method as claimed in claim 1, further comprising the step of correlating the tag response with a particular coil as the power level is adjusted.

7. The method as claimed in claim 1, wherein a plurality of tags are signaled by increasing the value of the powering field.

8. The method as claimed in claim 7, wherein the plurality of tags form a stack of tags.

9. The method as claimed in claim 7, wherein increasing the power field levels of coil energization in small steps enables a plurality of tags in stacks to be signaled.

10. The method as claimed in claim 1, wherein at least one tag is turned off once signaled.

11. The method as claimed in claim 1, wherein a plurality of coils are sequentially energized in accordance with the method of claim 1.

12. The method as claimed in claim 1, wherein signaling of the tag(s) comprises at least one of a tag read and powering of the tag(s).

13. An RFID system adapted to determine the location of a tag relative to two or more coils associated with an interrogator, in an RFID system, the system comprising:
    a driver adapted to energize a coil to provide a powering field having a first value; and
    logic means adapted to correlate the values of the powering field with a tag(s) location in accordance with the method of claim 1.

14. The system as claimed in claim 13, wherein the interrogator adjusts the value of the powering field until the tag(s) becomes active.

15. The system as claimed in claim 13, wherein the tag(s) provides a signal indicative of a measure of the signal strength received by the tag.

16. The system as claimed in claim 13, further comprising logic means adapted to correlate the tag response with a particular coil as the value of the powering field is adjusted.

17. The system as claimed in claim 13, wherein a plurality of tags are signaled by increasing the value of the powering field.

18. The system as claimed in claim 13, wherein increasing the value of the coil energization in small steps enables a plurality of tags in stacks to be signaled.

19. An apparatus adapted to communicate a signal to a tag in an RFID system, said apparatus comprising:
    processor means adapted to operate in accordance with a predetermined instruction set,
    said apparatus, in conjunction with said instruction set, being adapted to perform the method as claimed in claim 1.

20. The method as claimed in claim 1, wherein the interrogator adjusts the strength of the magnetic field and transmits a value indicative of the strength of the magnetic field.

21. The method as claimed in claim 20, wherein the tag stores the value indicative of the strength of the magnetic field when the tag has enough field strength to operate.

22. The method as claimed in claim 21, wherein the tag provides a reply signal which includes the value indicative of the strength of the magnetic field received by the tag when the tag first has enough field strength to operate.

* * * * *

UNITED STATES PATENT AND TRADEMARK OFFICE
CERTIFICATE OF CORRECTION

| | | |
|---|---|---|
| PATENT NO. | : 8,991,703 B2 | Page 1 of 1 |
| APPLICATION NO. | : 13/634319 | |
| DATED | : March 31, 2015 | |
| INVENTOR(S) | : Murdoch et al. | |

It is certified that error appears in the above-identified patent and that said Letters Patent is hereby corrected as shown below:

In the Specification

Column 6, Line 17    Replace "FIG. 56a" with -- FIG. 6a --

Signed and Sealed this
Twenty-ninth Day of September, 2015

Michelle K. Lee
*Director of the United States Patent and Trademark Office*